United States Patent [19]

Komatsu et al.

[11] Patent Number: 4,888,410

[45] Date of Patent: Dec. 19, 1989

[54] POLYCARBONATE END CAPPED WITH PENTAHALOPHENOXY GROUP

[75] Inventors: Takashi Komatsu; Eiichi Terada, both of Ichihara, Japan

[73] Assignee: Idemitsu Petrochemical Co., Ltd., Tokyo, Japan

[21] Appl. No.: 217,465

[22] Filed: Jul. 11, 1988

[30] Foreign Application Priority Data

Aug. 7, 1987 [JP] Japan .............................. 62-196268

[51] Int. Cl.$^4$ ............................................. C08G 63/62
[52] U.S. Cl. .................................... 528/198; 528/196
[58] Field of Search ........................................ 528/198

[56] References Cited

U.S. PATENT DOCUMENTS 3,751,400  8/1973  Crennan et al. ..................... 528/198
4,831,100  5/1989  Komatsu et al. .................... 528/198

FOREIGN PATENT DOCUMENTS 894877  3/1972  Canada .

Primary Examiner—Harold D. Anderson
Attorney, Agent, or Firm—Frishauf, Holtz, Goodman & Woodward

[57] ABSTRACT

Novel polycarbonate and a process for production thereof are disclosed. This polycarbonate has a main chain comprising a repeating unit of the general formula (A) shown below, a pentahalogenophenoxy group of the general formula (B) shown below at the terminal thereof, the molar fraction of the pentahalogenophenoxy group being within the specified range, and a viscosity average molecular weight of at least 15,000.

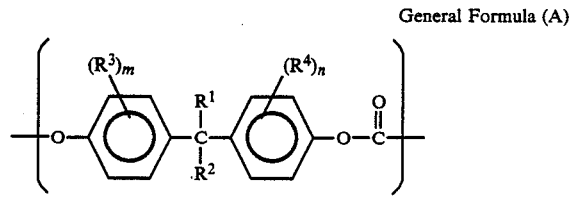

General Formula (A)

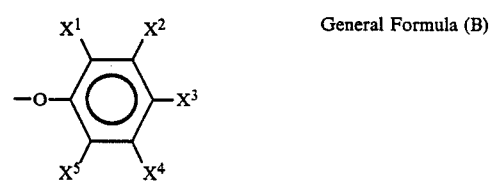

General Formula (B)

(wherein all the symbols are as defined in the appended claims). The polycarbonate is excellent in all of flame retardance, impact resistance, fluidity and transparency, and thus is suitable for production of various products such as home electric appliance and so on.

7 Claims, 2 Drawing Sheets

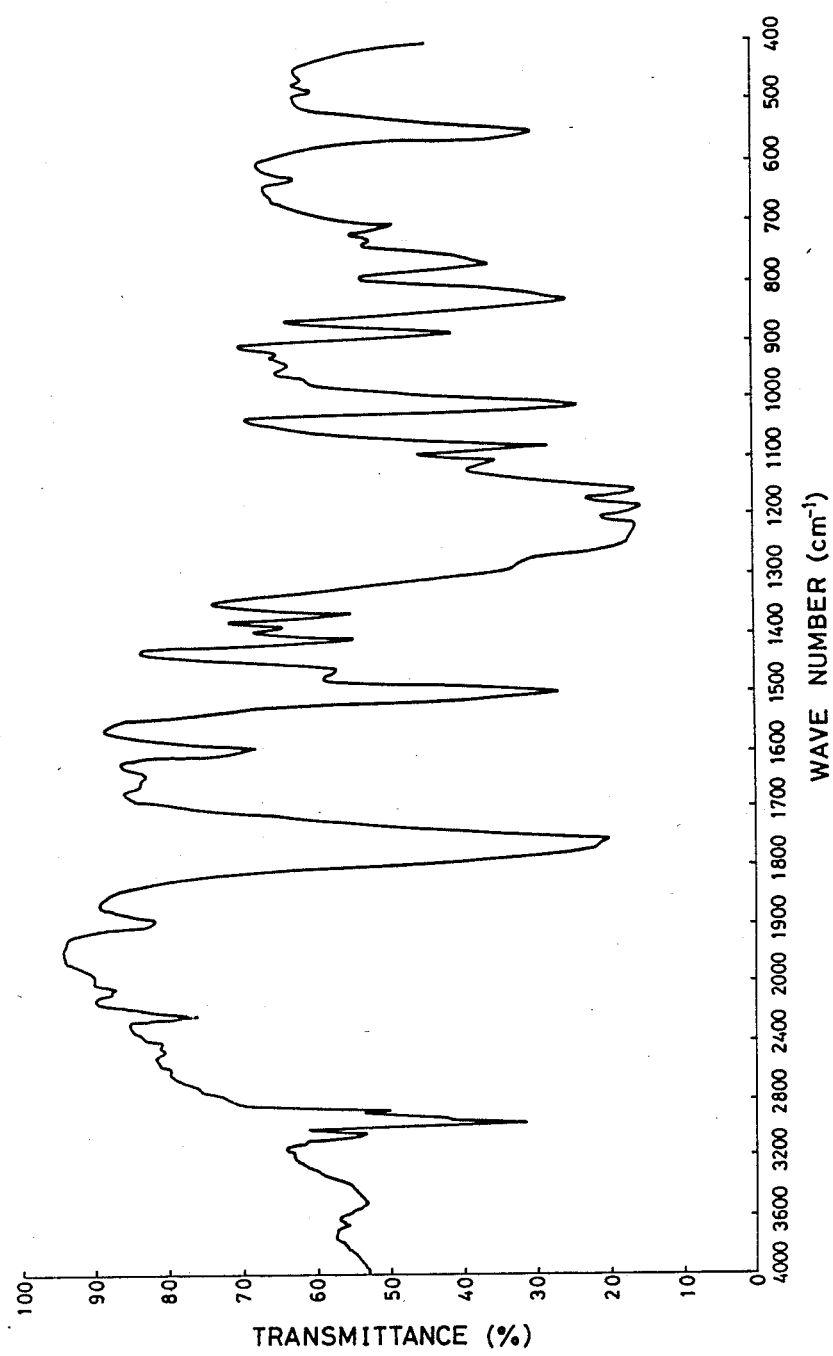

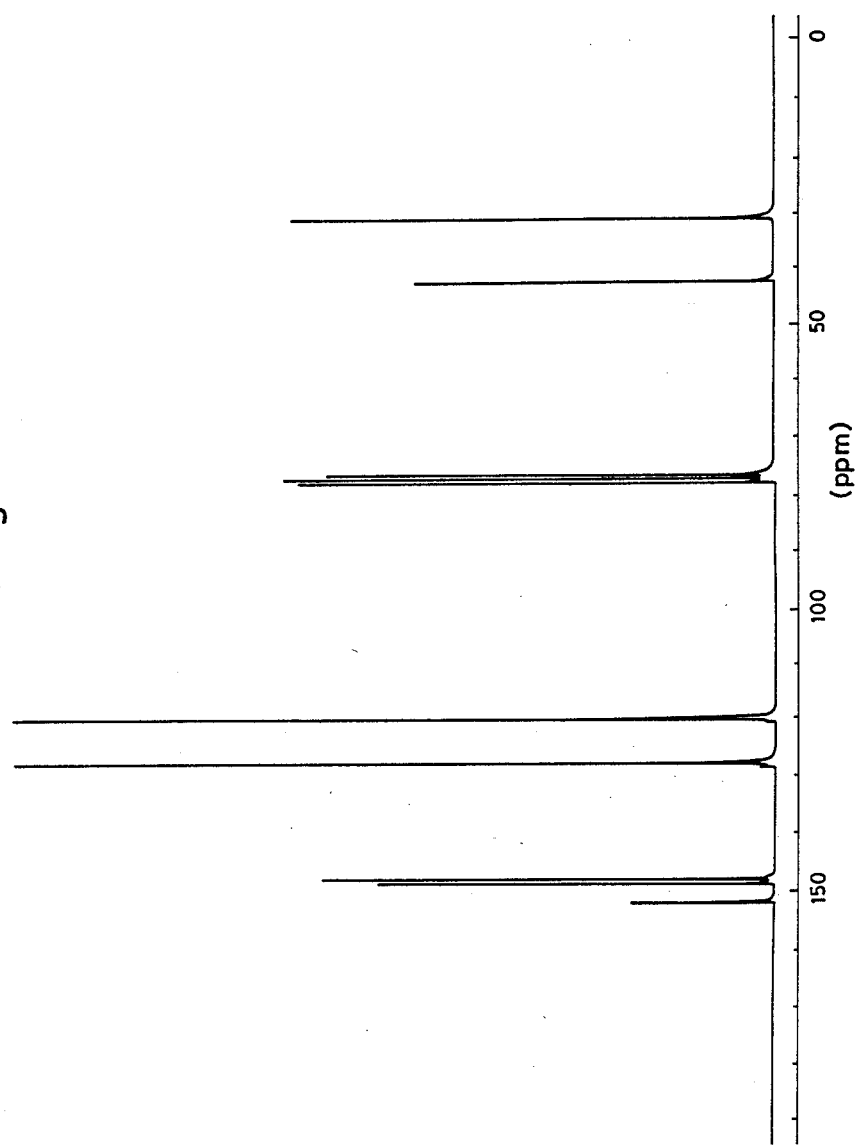

POLYCARBONATE END CAPPED WITH PENTAHALOPHENOXY GROUP

BACKGROUND OF THE INVENTION
1. Field of the Invention

The present invention relates to polycarbonate and a process for production thereof, and more particularly to novel polycarbonate which is excellent in all of flame retardance, impact resistance, fluidity and transparency and also to a process for efficiently producing said novel polycarbonate.

2. Description of Related Art

As flame retardant polycarbonates, a copolymer of tetrahalogenobisphenolsulfone and bisphenol A (BPA) (Japanese Patent Application Laid-Open No. 123294/1976), polycarbonate having an aromatic monosulfonyl group at the terminal thereof (Japanese Patent Application Laid-Open No. 21497/1979), a copolymer of tetrabromobisphenol A and BPA (Japanese Patent Application Laid-Open No. 155233/1982), polycarbonate having a sulfonic acid salt at the terminal thereof (PCT Japanese Patent Application Laid-Open No. 501212/1985), and so on have heretofore been known.

These conventional polycarbonates, however, are not sufficiently satisfactory in impact resistance, fluidity or transparency although they have high flame retardance. That is, polycarbonate excellent in all of flame retardance, impact resistance, fluidity and transparency has not yet been obtained.

Japanese Patent Publication No. 40715/1971 discloses polycarbonate produced using pentabromophenol as a molecular weight modifier. In the examples of the specification of Japanese Patent Publication No. 40715/1971, there are prepared only polycarbonates having a bromine content of 4.2% by weight or 3.3% by weight. Polycarbonate having such bromine contents, however, cannot be expected flame retardance of the extent that satisfies the standard V-0 specified in UL 94 1/16 inch (thickness). Furthermore, there is no description concerning impact resistance and fluidity of polycarbonate and, therefore, it can be seen that properties such as impact resistance and fluidity are not taken into consideration at all.

Japanese Patent Publication No. 41422/1972 discloses polycarbonate derived from tetrabromobispeenol A which is terminated in halogenated phenols. In this polycarbonate, however, neither impact resistance nor fluidity is taken into consideration and, therefore, it is considered that the polycarbonate is intended to be used merely as a flame retardant.

SUMMARY OF THE INVENTION

An object of the present invention is to provide polycarbonate which is excellent in all of flame retardance, impact resistance, fluidity and transparency.

Another object of the present invention is to provide a process for efficiently producing the above polycarbonate.

Other objects and advantages of the present invention will become apparent from the following detailed explanation.

The present invention relates to a polycarbonate having:

a main chain comprising a repeating unit represented by the general formula (A):

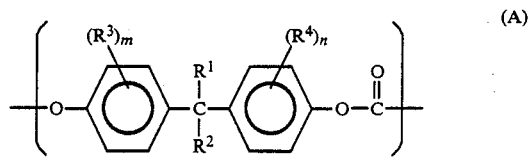

(wherein $R^1$ to $R^4$ are each a hydrogen atom or an alkyl group having 1 to 4 carbon atoms, and m and n are each an integer of 1 to 4):

a pentahalogenophenoxy group represented by the general formula (B):

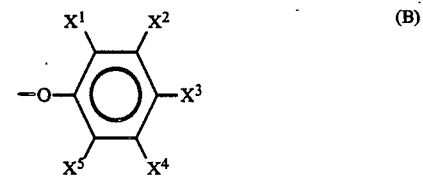

(wherein $X^1$ to $X^5$ are each a halogen atom) at the terminal thereof, the ratio of the molar fraction of the pentahalogenophenoxy group (b) to the molar fraction of the repeating unit (a) plus the molar fraction of the pentahalogenopheoxy group (b) (i.e., $b/(a+b)$) being 0.03 : 1 to 0.05 : 1; and a viscosity average molecular weight of at least 15,000.

The present invention further relates to a process for producing the above polycarbonate which comprises polymerizing an organic dihydroxy compound represented by the general formula (A'):

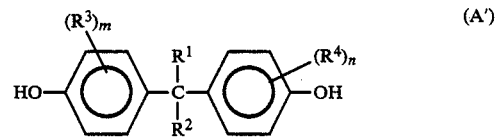

(wherein $R^1$ to $R^4$, m and n are the same as defined above) and a carbonate-forming derivative in a liquid medium in the presence as a molecular weight modifier of pentahalogenophenol represented by the general formula (B'):

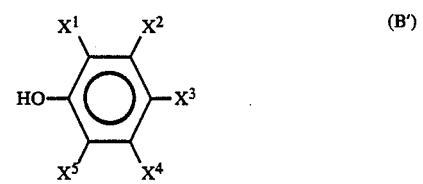

(wherein $X^1$ to $X^5$ are the same as defined above).

BRIEF DESCRIPTION OF THE DRAWINGS

FIG. 1 is an infrared absorption (IR) spectrum as measured by the KBr tablet method of the polymer obtained in Example 1; and FIG. 2 is a nuclear magnetic resonance (NMR) spectrum (solvent: $CDCl_3$; Standard: tetramethylsilane (TMS)) of the same polymer as above.

DESCRIPTION OF PREFERRED EMBODIMENTS

The polycarbonate of the present invention has a main chain comprising the repeating unit represented by the general formula (A). In the general formula (A), $R^1$ to $R^4$ may be the same or different and are each a hydrogen atom or an alkyl group having 1 to 4 carbon atoms (e.g., methyl, ethyl, n-propyl, iso-propyl, n-butyl, iso-butyl, sec-butyl, and tert-butyl), and m and n are each an integer of 1 to 4.

The polycarbonate of the present invention has the pentahalogenophenoxy group represented by the general formula (B) at the terminal thereof. In the general formula (B), $X^1$ to $X^5$ may be the same or different and are each a halogen atom (e.g., chlorine, bromine and fluorine). Representative examples of the pentahalogenopheoxy group are a pentabromophenoxy group, a pentachlorophenoxy group, a pentafluorophenoxy group and the like.

The viscosity average molecular weight of the polycarbonate of the present invention is at least 15,000 and preferably 15,000 to 30,000. If the viscosity average molecular weight is less than 15,000, impact resistance is poor.

The ratio of the molar fraction of the pentahalogenophenoxy group (b) to the molar fraction of the repeating unit (a) plus the molar fraction of the pentahalogenophenoxy group (b) (i.e., b/(a +b)) is 0.03 : 1 to 0.05 : 1. If the above ratio is less than 0.03 : 1, flame retardance and fluidity are not sufficiently high. On the other hand, if it is in excess of 0.05 : 1. impact resistance is not sufficiently high.

In the polycarbonate of the present invention, the main chain may contain a small amount of a repeating unit or repeating units other than the repeating unit of the general formula (A).

Although the polycarbonate of the present invention can be produced by various, it can be produced efficiently and with high quality particularly by the process of the present invention as described above.

In the process of the present invention, an organic dihydroxy compound represented by the general formula (A') and a carbonate-forming derivative are used as starting materials.

The organic dihydroxy compound of the general formula (A') includes various bisphenols. Representative examples of the bisphenols include 2,2-bis(4-hydroxyphenyl) propane (commonly called bisphenol A (BPA)),
bis(4-hydroxyphenyl)methane,
1,1-bis(4-hydroxyphenyl)ethane,
1,1-bis(4-hydroxyphenyl)propane,
2,2-bis(4-hydroxyphenyl)butane,
2,2-bis(4-hydroxyphenyl)pentane,
2,2-bis(4-hydroxyphenyl)isopentane,
2,2-bis(4-hydroxyphenyl)hexane,
2,2-bis(4-hydroxyphenyl)isohexane,
4,4-dihydroxytriphenylmethane,
4,4-dihydroxytetraphenylmethane,
1,1-bis(4-hydroxyphenyl)cyclohexane,
2,2-bis(4,4-hydroxy-3-methylphenyl)propane, and
2,2-bis(4,4-hydroxy-3,5-dimethylphenyl)propane.

As the carbonate-formig derivative, phosgene is usually used. In addition, bromophosgene, diphenyl carbonate, di-p-toly carbonate, phehyl-p-tolyl carbonate, di-p-chlorophenyl carbonate, dinaphthyl carbonate and the like can be used.

In the process of the present invention, it is necessary for the reaction of the organic dihydroxy compound of the general formula (A') and the carbonate-forming derivative to be carried out in the presence as a molecular weight modifier of pentahalogenophenol represented by the general formula (B').

Representative examples of the pentahalogenophenol include pentabromophenol, pentachlorophenol, and pentafluorophenol.

In the process of the present invention, the repeating unit of the general formula (A) is derived from the organic dihydroxy compound of the general formula (A') and the carbinate-forming derivative, and the pentahalogenophenoxy group of the general formula (B) as bonded at the terminal is derived from the pentahalonenophenol of the general formula (B'). Thus the amount of the pentahalogenophenol of the general formula (B') used is determined so that the ratio of b/(a +b) is 0.03 : 1 to 0.05 : 1. More specifically, the pentahalogenophenol is sufficient to be used in such an amount that the molar ratio of the pentahalogenophenol to the total of the organic dihydroxy compound of the general formula (A') and the pentahalogenophenol is about 0.03 : 1 to 0.05 : 1.

In accordance with the process of the present invention, the reaction is carried out in a liquid medium to produce polycarbonate. More specifically, the reaction is carried out according to, for example, the interfacial polymerization method or the pyridine method.

For example, the organic dihydroxy compound of the general formula (A') as dissolved in an aqueous alkali solution (e.g., an aqueous sodium hydroxide solution, an aqueous potassium hydroxide solution, and an aqueous sodium carbonate solution) is added to an inert organic solvent (e.g., methylene chloride, chloroform, chlorobenzene, and carbon tetrachloride), and the carbonate-forming derivative (e.g., phosgene) is blown therein to promote interfacial polymerization. In this reaction, pentahalogenophenol as a molecular weight modifier is added to the reaction system, previously or at a stage that the reaction proceeds to a certain extent. It is also effective that tertiary amine (e.g., triethylamine) be added to the reaction system as a catalyst (i.e., a dehydrohalogenation agent). The reaction system is preferably cooled with water or ice because the reaction is exothermic. Furthermore, since the reaction system becomes acidic as the reaction proceeds, it is preferred that the pH be maintained at 10 or more by adding an alkali while measuring with a pH meter.

In accordance with the pyridine method, the organic dihydroxy compound of the general formula (A') as a starting material and pentahalogenophenol as a molecular weight modifier are dissolved in pyridine or a mixed solvent of pyridine and an inert solvent, and on blowing the carbonate-forming derivative (e.g., phosgene) in the solution as prepared above, the desired polycarbonate results. The amounts of pentahalogenophenol and the carbonate-forming derivative (e.g., phosgene) being introduced determine the degree of polymerization, that is, molecular weight of the resulting polycarbonate. Thus the amounts of pentahalogenophenol and the carbonate-forming derivative being introduced are determined depending on the purpose of use of the polycarbonate. In blowing the carbonate-forming derivative, the amount of the carbonate-forming derivative introduced per hour is appropriately controlled so that the total amount of the carbonate-forming derivative introduced until the reaction is completed is equal to the necessary amount of the carbonate-forming derivative to be supplied.

On pouring the reaction mixture as obtained above in a large amount of a precipitating agent (e.g., methanol), the desired polycarbonate is precipitated.

More specifically, the present invention is preferably carried out by the following three embodiments: method (1) in which a solution of the organic diyhdroxy compound of the general formula (A') in an aqueous alkali solution, a solution of pentahalogenophenol in an aqueous alkali solution, an organic solvent (e.g., methylene chloride) and tertiary amine (e.g., triethylamine) as a catalyst are mixed, and the carbonate-forming derivative (e.g., phosgene) is blown in the above mixture to cause polycondensation, thereby producing the desired polycarbonate; method (2) in which a polycarbonate oligomer formed from the organic dihydroxy compound of the general formula (A') and the carbonate-forming derivative is mixed with a tertiary amine catalyst and solution of pentahalogenophenol in an aqueous alkali solution is added thereto to cause preliminary polymerization and, thereafter, a solution of the organic dihydroxy compound of the general formula (A') in an aqueous alkali solution is added thereto to cause polycondensation, thereby producing the desired polycarbonate; and method (3) in which a solution of the organic dihydroxy compound of the general formula (A') in an aqueous alkali solution, a solution of pentahalogenophenol in an aqueous alkali solution, and an organic solvent (e.g., methylene chloride) are mixed and the carbonate-forming derivative is blown therein to cause preliminary polymerization and, thereafter, a solution of the organic dihydroxy compound of the general formula (A') in an aqueous alkali solution and a tertiary amine catalyst are added thereto to cause polycondensation, thereby producing the desired polycarbonate.

As described above, the polycarbonate of the present invention is excellent in flame retardance and has good fluidity, and further has sufficiently high impact resistance and is excellent in transparency. In the polycarbonate of the present invention, the flame retardance as determined according to UL-94 1/16 inch (thickness) (Underwriter's Laboratories Subject 94, using a test piece 1/16 inch in thickness) is V-0, the Izod impact value (notched, ductile fracture at ordinary temperature) as a measure of impact resistance is at least 50 kg·cm/cm, the flow value as a measure of fluidity, indicating a capability for molding a thin film is at least $4 \times 10^{-2}$ ml/sec, and the transparency is high.

The polycarbonate of the present invention can be widely used in production of various industrial products such as home electric appliances, office automation apparatuses, construction materials and so on.

Polycarbonate having the above characteristics can be efficiently produced by the process of the present invention.

The present invention is described in greater detail with reference to the following examples.

PREPARATION EXAMPLE

Preparation of Polycarbonate Oligomer of Bisphenol A 91 g of bisphenol A, 330 ml of methylene chloride and 560 ml of a 2.0 N aqueous solution of sodium hydroxide were placed in a 2-liter flask equipped with a stirrer, and phosgene was blown therein for 90 minutes while stirring and cooling on a water bath. On allowing the reaction mixture to stand at room temperature, a methylene chloride solution of the formed oligomer was seperated as a lower layer. The concentration of the oligomer in the oligomer solution was 320 g/L(L:liter), and the oligomer had a number average molecular weight of 850 and a chloroformate group concentration of 0.7 mol/L.

EXAMPLE 1

10 L of the polycarbonate oligomer obtained in the above preparation example and 4.4 g (0.043 mol) of triethylamine were placed in a 50-L reactor equipped with a stirrer and stirred at 500 rpm. After 10 minutes, a solution of pentabromophenol in an aqueous sodium hydroxide solution (pentabromophenol: 247 g (0.51 mol); sodium hydroxide: 40.5 g; water: 3.3 L) was introduced in the reactor, and the resulting mixture was stirred. After 50 minutes, 3.9 L of a solution of bisphenol A in an aqueous sodium hydroxide solution (bisphenol A: 408 g (1.79 mol); sodium hydroxide: 269 g; water: 3.4 L) and 6 L of methylene chloride were introduced in the reactor, and the resulting mixture was stirred.

After stirring for 60 minutes, the reaction mixture was separated into an aqueous layer and a methylene chloride layer containing the formed polymer.

This methylene chloride layer was washed with water, an acid (0.1 N hydrochloric acid) and water in this sequence. Upon removal of the methylene chloride from the methylene chloride layer at 40° C. under reduced pressure, a white powder was obtained. This white powder was dried at 120° C. for one day and night and, thereafter, melted and pelletized by the use of an extruder. The viscosity average molecular weight of the pellet polymer was 17,600. The molar fraction of the pentabromophenxy group in the polymer was 4.7 mol%.

The pellets were injection molded at a temperature of 280° C. under an injection pressure of 56 kg/cm$^2$ by the use of an injection molding machine to obtain a test piece. This test piece was measured for Izod impact resistance and flame retardance, and its transparency was determined with the eye. The flow value of the pellet was measured by the use of a flow tester.

The bromine content of the pellet as measured by the Volhard method after alkali decomposition was 7.1% by weight.

The results are shown in Table 1.

An infrared absorption (IR) spectrum of the polymer is shown in FIG. 1, and a nuclear magnetic resonance (NMR) spectrum of the polymer is shown in FIG. 2.

EXAMPLES 2 AND 3, AND COMPARATIVE EXAMPLES 1 AND 2

Polymers having varied bromine contents were prepared in the same manner as in Example 1 except that the amounts of pentabromophenol and bisphenol A used were changed.

Characteristics of the polymers are shown in Table 1.

EXAMPLE 4

An aqueous bisphenol A solution (prepared by dissolving 60 kg of bisphenol A in 400 L of a 5% aqueous sodium hydroxide solution), an aqueous pentabromophenol solution (prepared by dissolving 82 kg of pentabromophenol in 400 L of a 4% aqueous sodium hydroxide solution), methylene chloride, and an aqueous triethylamine solution (concentration: 33 g/L) were introduced in a tubular reactor (inner diameter: 10 mm; length: 10 m) at flow rates of 138 L/hr, 11 L/hr, 50 L/hr and 100 ml/hr, respectively, and phosgene was blown in the tubular reactor in parallel at a flow rate of 11 kg/hr to react.

The tubular reactor was a jacketed tube, and the discharge temperature of the reaction mixture was maintained at 25° C. by passing cooling water through the jacketed portion.

After the reaction in the tubular reactor, the reaction mixture was introduced in a 100-liter vessel-type reactor and the reaction was continued for 3 hours. Then the reaction mixture was treated in the same manner as in Example 1, and the white powder thus obtained was analyzed in the same manner as in Example 1.

The results are shown in Table 1.

EXAMPLE 5

(1) Preparation of Oilgomer

An aqueous bisphenol A solution, an aqueous pentabromophenol solution, an aqueous triethylamine solution all the same as used in Example 4, and methylene chloride were introduced in the same tubular reactor as used in Example 4 at flow rates of 138 L/hr, 11 L/hr, 100 ml/hr and 50 L/hr, respectively, and phosgene was blown therein in parallel at a flow rate of 11 kg/hr to react. On allowing the reaction mixture to stand at room temperature, a methylene chloride solution of an oligomer was separated as a lower layer.

The number average molecular weight of the oligomer was 850, and the concentration of the chloroformate group was 0.7 mol/L.

(2) Production of Polycarbonate 500 ml of the oligmer obtained in (1) above, 300 ml of a solution of bisphenol A in an aqueous sodium hydroxide solution (bisphenol A: 35.9 g; sodium hydroxide: 21.0 g; water: 270 ml), 0.11 g of triethylamine, and 250 ml of methylene chloride were placed in a 2-liter reactor and reacted for one hour while stirring at 500 rpm.

Then the reaction mixture was treated in the same manner as in Example 1, and the white powder thus obtained was analyzed in the same manner as in Example 1.

The results are shown in Table 1.

What is claimed is:

1. A polycarbonate having:
a main chain comprising a repeating unit presented by the formula (A):

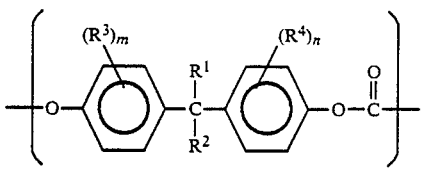

wherein $R^1$ to $R^4$ are each a hydrogen atom or an alkyl group having 1 to 4 carbon atoms, and m and n are each an integer of 1 to 4;

a pentahalogenophenoxy group represented by the formula (B):

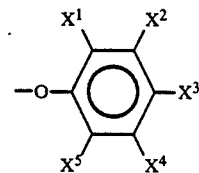

wherein $X^1$ to $X^5$ are each a halogen atom, at the terminal thereof, the ratio of the molar fraction of the pentahalogenophenoxy group (b) to the molar fraction of the repeating unit of the general formula (A) (a) plus the molar fraction of the pentahalogenophenoxy group (b) represented by $b/(a+b)$ being 0.03 : 1 to 0.05 : 1; and a viscosity average molecular weight of at least 15,000.

2. The polycarbonate of claim 1 wherein $R^1$, $R^2$, $R^3$ and $R^4$ are individually selected from the group consisting of methyl, ethyl, n-propyl, isopropyl, sec-butyl and tert-butyl; and $X^1$, $X^2$, $X^3$, $X^4$ and $X^5$ are individually selected from the halogens consisting of chlorine, bromine and fluorine.

3. The polycarbonate of claim 2 wherein the viscosity average molecular weight is 15,000 to 30,000.

4. The polycarbonate of claim 3 wherein the viscosity average molecular weight is 17,600 to 18,800.

TABLE 1

| | Molar Fraction of Pentabromophenoxy Group*1 (%) | Bromine Content of Polymer*2 (wt %) | Viscosity Average Molecular Weight*3 | Flow Rate*4 (ml/s) | Izod Impact Value (notched)*5 (kg cm/cm) | Flame Retardance*6 | Transparency |
|---|---|---|---|---|---|---|---|
| Example 1 | 4.7 | 7.1 | 17,600 | $9.0 \times 10^{-2}$ | 68 | V-0 | Transparent |
| Example 2 | 3.4 | 5.2 | 22,500 | $4.5 \times 10^{-2}$ | 71 | V-0 | Transparent |
| Example 3 | 4.0 | 6.1 | 18,800 | $7.2 \times 10^{-2}$ | 70 | V-0 | Transparent |
| Comparative Example 1 | 2.7 | 4.2 | 25,500 | $1.9 \times 10^{-2}$ | 82 | V-2 | Transparent |
| Comparative Example 2 | 5.3 | 8.0 | 14,700 | $16 \times 10^{-2}$ | 10 | V-0 | Transparent |
| Example 4 | 4.5 | 6.8 | 17,900 | $8.7 \times 10^{-2}$ | 69 | V-0 | Transparent |
| Example 5 | 4.4 | 6.7 | 18,100 | $8.6 \times 10^{-2}$ | 71 | V-0 | Transparent |

*1 A polymer sample was hydrolyzed, and its molar fraction of the pentabromophenoxy group was determined by liquid chromatography.
*2 The bromine content was measured by the Volhard method after alkali decomposition.
*3 The viscosity average molecular weight (Mv) was calculated from a viscosity of a methylene chloride solution of a polymer sample as measured at 20° C. by the use of a Ubbellohde viscometer.
*4 The flow value was measured according to JIS-K-7210 (load: 160 kg/cm²).
*5 The Izod impact value was measured according to JIS-K-7110 using a test piece of ⅛ inch in thickness.
*6 The flame retardance was measured according to UL-94 (Underwriter's Laboratory Subject 94) using a test piece of 1/16 inch in thickness.

5. The polycarbonate of claim 3 wherein the molar fraction ratio is 0.044–0.047 to 1.

6. The polycarbonate of claim 3 wherein the molar fraction ratio is 0.034 to 1.

7. The polycarbonate of claim 3 wherein the molar fraction ratio is 0.04 to 1.

* * * * *

UNITED STATES PATENT AND TRADEMARK OFFICE
CERTIFICATE OF CORRECTION

PATENT NO. : 4,888,410

DATED : December 19, 1989

INVENTOR(S) : Komatsu et al

It is certified that error appears in the above-identified patent and that said Letters Patent is hereby corrected as shown below:

Column 7, line 68, (Claim 1): "presented" should be --represented--.

Signed and Sealed this

Twenty-fourth Day of September, 1991

Attest:

HARRY F. MANBECK, JR.

*Attesting Officer*  *Commissioner of Patents and Trademarks*